(12) United States Patent
Deck

(10) Patent No.: US 6,995,848 B2
(45) Date of Patent: *Feb. 7, 2006

(54) METHOD AND APPARATUS FOR CALIBRATING A WAVELENGTH-TUNING INTERFEROMETER

(75) Inventor: Leslie L. Deck, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 380 days.

This patent is subject to a terminal disclaimer.

(21) Appl. No.: 10/315,302

(22) Filed: Dec. 10, 2002

(65) Prior Publication Data

US 2003/0164951 A1 Sep. 4, 2003

Related U.S. Application Data

(60) Provisional application No. 60/339,217, filed on Dec. 10, 2001.

(51) Int. Cl.
*G01B 9/02* (2006.01)

(52) U.S. Cl. .................................................. 356/512
(58) Field of Classification Search ................ 356/496, 356/504, 511, 512, 513, 514, 519
See application file for complete search history.

(56) References Cited

U.S. PATENT DOCUMENTS

| 4,594,003 A | 6/1986 | Sommargren | 356/349 |
|---|---|---|---|
| 6,006,128 A | 12/1999 | Izatt et al. | 600/476 |
| 6,028,670 A | 2/2000 | Deck | |
| 6,359,692 B1 | 3/2002 | de Groot | 356/512 |
| 2001/0055118 A1 | 12/2001 | Nawracala | |
| 2002/0126293 A1 | 9/2002 | Deck | 356/496 |
| 2003/0160968 A1 * | 8/2003 | Deck | 356/515 |

FOREIGN PATENT DOCUMENTS

DE 199 58 136 6/2001

OTHER PUBLICATIONS

Doorer, Christophe et al. "Precision and consistency criteria in spectral phase interferometry for direct electric–field reconstruction." Journal of the Optical Society of America, vol. 19, Issue 5, May 2002, pp. 1030–1038.*

Kim, Daesuk et al. "Direct spectral phase function calculation for dispersive interferometric thickness profilometry." Optics Express, vol. 12, No. 21, Oct. 2004, pp. 5117–5124.*

L. Deck; "Measurements using Fourier–Transform Phase Shifting Interferometry", Proc. ASPE 25, 115–118 (2001).

L. Deck; "Multiple Surface Phase Shifting Interferometry", Proc. SPIE, 4451, 424–430 (2001).

L. Deck and J.A. Soobitsky, "Phase–shifting via wavelength tuning in very large aperture interferometers," Proc. SPIE, 3782–58, 432–442, 1999.

(Continued)

*Primary Examiner*—Samuel A. Turner
*Assistant Examiner*—Michael A. Lyons
(74) *Attorney, Agent, or Firm*—Fish & Richardson P.C.

(57) ABSTRACT

Methods for determining an appropriate tuning rate for interferometry systems employing phase-shifting interferometry are disclosed.

65 Claims, 5 Drawing Sheets

OTHER PUBLICATIONS

L. Deck; "Simultaneous Multiple Surface Measurements using Fourier–Transform Phase Shifting Interferometry, in: 4th International workshop on automatic processing of fringe patterns", Fringe 2001, Elsevier, Paris, (2001), 230–236.

P. de Groot, "Chromatic dispersion effects in coherent absolute ranging," Opt. Lett., vol. 17, pp. 898–900, 1992.

Peter de Groot, "Derivation of algorithms for phase–shifting interferometry using the concept of a data–sampling window," Applied Optics, vol. 34, p. 4723, 1995.

Peter de Groot, "Measurement of transparent plates with wavelength–tuned phase–shifting interferometry," Applied Optics, vol. 39, No. 16, pp. 2658–2663, 2000.

Klaus Freischlad, "Fourier Analysis of Phase Shifting Algorithms," Proc. SPIE vol. 3407, pp. 73–85, 1998.

K. Freischlad, "Large flat panel profiler," Proc. SPIE 2862, pp. 163–171, 1996.

J.E.Greivenkamp and J.H.Bruning, "Phase shifting interferometry," Optical Shop Testing, D. Malacara, pp. 501–598, J.Wiley, New York, 1992.

Kinoshita M. et al., "Optical Frequency–Domain Imaging Microprofilometry with a Frequency–Tunable Liquid–Crystal Fabry–Perot Etalon Device", *Applied Optics, Optical Society of America,* vol. 38, No. 34, Dec. 1, 1999, pp. 7063–7068.

Okada et al., "Separate measurements of surface shapes and refractive index inhomogeniety of an optical element using tunable–source phase shifting interferometry," Applied Optics, vol. 29, No. 22, pp. 3280–3285, 1990.

M. Suematsu and M. Takeda, "Wavelength–shift interferometry for distance measurements using Fourier transform technique for fringe analysis," Applied Optics, vol. 30, No. 28, pp. 4046–4055, 1991.

Susumu Kuwamaura and Ichirou Yamaguchi, "Wavelength scanning profilometry for real–time surface shape measurement," Appl. Opt., 36, 4473–4482 (1997).

* cited by examiner

METHOD AND APPARATUS FOR CALIBRATING A WAVELENGTH-TUNING INTERFEROMETER

CROSS-REFERENCE TO RELATED APPLICATIONS

This application claims priority to Provisional Patent Application No. 60/339,217, entitled "METHOD AND APPARATUS FOR CALIBRATING A WAVELENGTH-TUNING INTERFEROMETER," filed on Dec. 10, 2001, the contents of which are incorporated herein by reference in their entirety.

BACKGROUND

This invention relates to interferometry, and more particularly to phase-shifting interferometry.

Interferometric optical techniques are widely used to measure optical thickness, flatness, and other geometric and refractive index properties of precision optical components such as glass substrates used in lithographic photomasks.

For example, to measure the surface profile of a measurement surface, one can use an interferometer to combine a measurement wavefront reflected from the measurement surface with a reference wavefront reflected from a reference surface to form an optical interference pattern. Spatial variations in the intensity profile of the optical interference pattern correspond to phase differences between the combined measurement and reference wavefronts caused by variations in the profile of the measurement surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns that span at least a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

PSI data can be analyzed using PSI algorithms. A PSI algorithm presumes a certain phase shift (e.g., 45° or 90°, depending on the algorithm) between successive intensity values acquired at each spatial location of the interference pattern during the phase shifting. In other words, a PSI algorithm assumes that the intensity pattern will vary at a particular frequency which corresponds to a set phase shift between each intensity value. The PSI algorithm extracts a phase of the intensity pattern at each spatial location based on the phase shift. Because each PSI algorithm assumes a certain phase shift in extracting phase information from the interference pattern, any deviation from presumed phase shift will compromise the accuracy of the extracted phases, reducing the fidelity of a measurement. Examples of PSI algorithms are described, for example, in U.S. patent application Ser. No. 09/349,593, entitled "METHOD AND SYSTEM FOR PROFILING OBJECTS HAVING MULTIPLE REFLECTIVE SURFACES USING WAVELENGTH-TUNING," filed on Jul. 9, 1999, to Peter de Groot.

In order to ensure that the interference occurs with a frequency appropriate for a PSI algorithm (i.e., the phase shift between intensity values is appropriate for the algorithm), the rate at which the optical frequency varies during wavelength tuning should be set to an appropriate value. The interference frequency, f, is a function of both the tuning rate, $\dot{v}$, and the cavity total optical path length (OPL), D, via $$f = \frac{\dot{v}D}{c}, \qquad (1)$$

where c is the speed of light. Thus, according to equation 1, the cavity OPL should be known in order to set a tuning rate at a value such that the interference occurs with a frequency appropriate for the PSI algorithm being used. Typically, the user will input a nominal value for D, from which a suitable tuning rate can be set.

More recently, alternative techniques for analyzing PSI data have been disclosed in which PSI data is transformed into a domain that produces spectrally separated peaks each corresponding to a particular pair of surfaces in an interferometric cavity defined by multiple pairs of surfaces. Each peak provides optical path length and surface reflectivity information about a corresponding pair of surfaces in the cavity. As a result, the interferometric data from such cavities provides simultaneous information about multiple surfaces. For example, information about any particular surface may be determined generically. Such PSI analysis techniques, referred to as Frequency Transform Phase Shifting Interferometry ("FTPSI"), are described in, for example, U.S. patent application Ser. No. 09/919,511, entitled "FREQUENCY TRANSFORM PHASE SHIFTING INTERFEROMETRY," filed on Jul. 31, 2001

For cavities formed by a single pair of surfaces, this latter technique does not require prior knowledge of the cavity OPL in order to set an appropriate tuning rate, because the transform provides information for a range of frequencies. Information may be determined without the need for a preset phase interval between adjacent data points, the phase interval being associated with a particular cavity length of interest. The interferometric phase of each cavity can be determined from the transform of the interference data, evaluated approximately at the peak frequency.

However, in these embodiments, the frequency range of the transform should be appropriate for the interference frequency of the cavity. In particular, the optical frequency tuning rate should being sufficiently high to resolve the cavity of interest. For example, in the case of FTPSI utilizing a Fourier transform, the spectral resolution limit, $f_{min}$, is inversely proportional to the observation time, $\Delta t$, and the minimal resolvable interference frequency is $$f_{\min} = \frac{1+\mu}{\Delta t} = \frac{(1+\mu)f_S}{N}. \quad (2)$$

First order frequencies should be separated by at least $f_{min}$ to be resolved. In equation 2, $f_s$ is the sampling frequency, N is the total number of intensity samples acquired, and the parameter $\mu$ is introduced as a practical matter. The theoretical resolution limit occurs when $\mu=0$, but in practice, the minimum resolvable frequency should be somewhat larger to account for potential instrumental deficiencies and phase error sensitivities. Setting f in equation 1 to $f_{min}$, the minimum resolvable OPL, $D_{min}$, can be expressed as $$D_{\min} = \frac{c(1+\mu)f_S}{\dot{v}N}. \quad (3)$$

In other words, the spectral resolution is inversely proportional to the tuning rate. Hence, a relatively small tuning rate can result in poor resolution (i.e., a relatively large resolution limit).

In addition, for a fixed sampling frequency, the tuning rate should be low enough to avoid aliasing. Aliasing occurs due to the number of samples acquired during a tune being finite. Aliasing can occur when the sampling frequency is less than or equal to the Nyquist frequency (also known as the folding frequency). Accordingly, in order for the frequency, f, associated with a cavity to be detected without aliasing, the sampling frequency should be more than twice f. Thus, when the tuning rate is too high, the contribution to the interference signal at f can be aliased to a lower frequency, potentially corrupting the data.

Therefore, even when using FTSPI, it is desirable to precalibrate the interferometry system by selecting a tuning rate appropriate for the cavity OPL using methods disclosed herein.

SUMMARY

The invention features methods and systems that perform phase-shifting interferometry (PSI) using optical frequency modulation to generate phase shifts in, for example, an unequal path interferometer (e.g., a Fizeau interferometer). More particularly, the invention features methods for quickly determining an appropriate optical frequency tuning rate prior to acquiring the interferogram used in the final metrology. The optical frequency tuning rate is referred to simply as the "tuning rate," or by the symbol $\dot{v}$, and is defined as the rate of change of the optical frequency with respect to time. The tuning rate can be constant, or can vary as a function of time.

One way to determine an appropriate tuning rate is to request cavity OPL information from the user prior to performing the interferometry measurement. The subsequent interferometry measurement is then performed using a tuning rate selected according the user-designated OPL information. Another solution, which can enhance the level of automation of the interferometry measurement, is to use the interferometry system itself to determine an appropriate tuning rate.

Accordingly, in certain aspects, the invention features methods to determine an appropriate tuning rate for PSI interferometers where the cavity OPL is a priori unknown by the interferometry system. In particular, these methods can provide a greater level of automation in PSI systems, because they do not require the user to input information related to the cavity OPL into the system prior to performing phase shifting interferometry.

In a first set of embodiments of the invention, the interferometry system includes a pre-characterized light source, so that the tuning rate can be controlled with sufficient accuracy to provide constant tuning rates. To determine an appropriate tuning rate for PSI, the system acquires a series of interferograms using a series of different constant tuning rates. The constant tuning rates can be selected so that at least one of the interference frequency spectra will produce a non-aliased spectral peak for any cavity within the allowed cavity OPL range of the interferometer. In preferred implementations, the acquisition begins with the lowest rate, and increases the rate in discrete steps until the frequency spectrum indicates a spectral peak of sufficient power. Starting at the lowest rate ensures that the first resolved peak will be the true peak, not an aliased peak. The OPL is then recovered from the position of the spectral peak, and an appropriate tuning rate with which to perform PSI is then determined.

In a second set of embodiments, the optical frequency is monitored with an additional apparatus called a wavelength monitor (e.g., an interferometer cavity with a known OPL) to produce a phase indicative of the optical frequency. To determine an appropriate tuning rate for PSI, the system acquires an interference signal using a linearly varying tuning rate. The optical frequency spans a subset of the full source tuning range while acquiring a predetermined number of samples of the interference intensity from the interferometer cavity. The sampled data is then analyzed with a transform based on the phase indicative of the optical frequency, called an OPL transform. The OPL transform accounts for the non-constant tuning rate by using the wavelength monitor information. The OPL transform produces information similar to a frequency spectrum, except that instead of optical power vs. frequency it provides optical power vs. OPL directly. The predicted OPL is that point in the OPL spectrum that has the highest power. The predicted OPL can then be used to determine a tuning rate for PSI, further automating the PSI system.

More generally, in further embodiments, the tuning rate can be varied as desired (e.g., with a quadratic time dependance, or some higher order polynomial), provided the system is able to reliably transform the interference signal to a spectrum corresponding to the cavity OPL.

We now summarize different aspects and features of the invention.

In one aspect, the invention features an interferometry method including: i) forming an optical interference image by combining different portions of an optical wave front reflected from multiple surfaces; ii) varying a frequency of the optical wave front at a plurality of different frequency tuning rates; iii) recording an interference signal at at least one location of the optical interference image in response to the varying of the frequency; iv) transforming at least a portion of the interference signal for the at least one location to produce a spectrum having a peak at a spectral coordinate corresponding to a pair of the multiple surfaces; v) selecting a frequency tuning rate based on the spectral coordinate of the peak; and vi) recording an interference signal at multiple locations of the optical interference image in response to varying the frequency at the selected tuning rate.

Embodiments of the interferometry method may include any of the following features.

At least one of the different tuning rates may be sufficiently large to resolve an optical path length corresponding to the pair of surfaces. Also, at least one of the different tuning rates may be smaller than a maximum tuning rate corresponding to a Nyquist sampling rate for the pair of the multiple surfaces.

The varying of the frequency of the optical wave front may include varying the frequency at a first constant frequency tuning rate. It may further include varying the frequency at one or more additional constant frequency tuning rates different from the first constant frequency tuning rate. Moreover, the interference signal may be transformed for each of the different constant tuning rates to produce a corresponding spectrum, where the peak corresponding to the pair of multiple surfaces is present in at least one of the spectrums.

The spectrum may be produced by transforming the interference signal into the frequency domain.

The spectrum may be produced by transforming the interference signal into an optical path length (OPL) domain.

The varying of the frequency of the optical wave front may include linearly varying the frequency tuning rate. It may further include non-linearly varying the frequency tuning rate.

The method may further include monitoring a reference phase from a reference cavity produced in response to an additional portion of the optical wave front. Furthermore, the spectrum may produced by transforming the interference signal into an optical path difference length (OPL) based on the monitored reference phase. For example, the spectrum S may correspond to $S(D)=|OPLT(D)|^2$, where D is a variable for optical path difference and OPLT(D) is an OPD transform, which can be expressed as:

$$OPLT(D) = \sum_{j=0}^{N-1} I_j W_j \exp\left(-i\varphi_{Mj} \frac{D}{D_M}\right) \Delta\varphi_{Mj},$$

where there are N increments to the varying of the optical wave frequency, j is an index for the N increments, $I_j$ is the interference signal at increment j, $W_j$ is a value for a weighting function at increment j, $D_M$ corresponds to an optical path length of the reference cavity, $\phi_{Mj}$ is the monitored reference phase at increment j, and $\Delta\phi_{Mj}$ is an increment in the monitored reference phase corresponding to increment j. In some embodiments, the weighting function may be ignored (i.e., it may set to unity) When using the OPD transform, the varying of the frequency of the optical wave front may include linearly varying the frequency tuning rate. It may further include non-linearly varying the frequency tuning rate.

The spectral coordinate of the peak corresponding to the pair of the multiple surfaces may correspond to the spectral coordinate at which the spectrum has the highest power.

The selected tuning rate may be a constant tuning rate.

The selected tuning rate may be one of the plurality of different tuning rates, or it may be different from the plurality of different tuning rates.

The method may further include extracting a phase for each of the multiple locations based on the interference signal for the selected tuning rate. Furthermore, it may further include calculating a surface profile for at least one of the pair of surfaces or an optical thickness profile of the pair of surfaces, based on the extracted phases. The extracting of the phases may include applying a PSI algorithm to the interference signal for the selected tuning rate at each of the multiple locations. Alternatively, the extracting of the phases may include transforming the interference signal for the selected tuning rate for each of the multiple locations and determining a phase of the transformed signal at a transform coordinate corresponding to the pair of multiple surfaces for each of the multiple locations.

The multiple surfaces may consist of two surfaces. Alternatively, the multiple surfaces may include three or more surfaces.

In general, in another aspect, the invention features an interferometry method including: i) forming an optical interference image by combining different portions of an optical wave front reflected from multiple surfaces; ii) varying a frequency of the optical wave front at each of multiple constant tuning rates; iii) for each constant frequency tuning rate, recording an interference signal at at least one location of the optical interference image in response to the varying frequency and transforming the interference signal to produce a corresponding spectrum; iv) identifying a peak corresponding to a pair of the multiple surfaces in at least one spectrum; v) selecting a frequency tuning rate based on a spectral coordinate of the peak; and vi) recording an interference signal at a plurality of locations of the optical interference image in response to varying the frequency at the selected tuning rate.

Embodiments of the method may include any of the following embodiments.

The multiple constant tuning rates may become consecutively larger in absolute magnitude.

The multiple constant tuning rates may include a tuning rate sufficiently large to resolve an optical path length corresponding to the pair of surfaces and a tuning rate smaller than a maximum tuning rate corresponding to a Nyquist sampling rate for the pair of the multiple surfaces.

The method may further include extracting a phase for each of the multiple locations based on the interference signal for the selected tuning rate.

In general, in another aspect, the invention features an interferometry method including: forming an optical interference image by combining different portions of an optical wave front reflected from multiple surfaces; varying a frequency of the optical wave front over a range of tuning rates; ii) recording an interference signal at at least one location of the optical interference image in response to the varying frequency; iii) monitoring a reference phase from a reference cavity produced in response to an additional portion of the optical wave front; and iv) transforming the interference signal for the at least one location into an optical path length (OPL) domain based on the monitored reference phase to produce a spectrum having a peak at an OPL corresponding to a pair of the multiple surfaces.

Embodiments of the method may include any of the following embodiments.

The varying of the frequency of the optical wave may include linearly varying the tuning rate. It may further include nonlinearly varying the tuning rate.

The range of tuning rates may include a tuning rate sufficiently large to resolve an optical path length corresponding to the pair of surfaces and a tuning rate smaller than a maximum tuning rate corresponding to a Nyquist sampling rate for the pair of the multiple surfaces.

The spectrum S may correspond to $S(D)=|OPLT(D)|^2$, where D is a variable for optical path difference and OPLT (D) is an OPD transform, which can be expressed as:

$$OPLT(D) = \sum_{j=0}^{N-1} I_j W_j \exp\left(-i\varphi_{Mj}\frac{D}{D_M}\right)\Delta\varphi_{Mj},$$

where there are N increments to the varying of the optical wave frequency, j is an index for the N increments, $I_j$ is the interference signal at increment j, $W_j$ is a value for a weighting function at increment j, $D_M$ corresponds to an optical path length of the reference cavity, $\phi_{Mj}$ is the monitored reference phase at increment j, and $\Delta\phi_{Mj}$ is an increment in the monitored reference phase corresponding to increment j. In some embodiments, the weighting function may be ignored (e.g., set to unity).

The method may further include: selecting a frequency tuning rate based on the OPL of the peak; and recording an interference signal at a plurality of locations of the optical interference image in response to varying the frequency at the selected tuning rate. For example, the selected tuning rate is a constant tuning rate. Moreover, the method may further include extracting a phase for each of the multiple locations based on the interference signal for the selected tuning rate.

The latter two method aspects may further include corresponding features listed above with respect to the first method aspect.

In general, in another aspect, the invention features a system including: i) a frequency-tunable light source; ii) an interferometer which during operation directs different portions of an optical wave front derived from the light source to multiple surfaces and recombines the different portions to form an optical interference image; iii), a multi-element photo-detector positioned to measure an interference signal at different locations of the optical interference image in response to varying the frequency of the light source; and iv) an electronic controller coupled to the light source and the photo-detector. During operation the controller: i) varies the frequency of the light source at a plurality of different tuning rates; ii) records an interference signal corresponding to the plurality of different tuning rates for at least one of the locations; iii) transforms at least a portion of the interference signal corresponding to the plurality of different tuning rates to produce a spectrum having a peak at a spectral coordinate corresponding to a pair of the multiple surfaces; iv) selects a frequency tuning rate based on the spectral coordinate of the peak; v) varies the frequency of the light source at the selected frequency tuning rate; and vi) records the interference signal corresponding to the selected tuning rate for each of the different locations of the optical interference image.

In general, in another aspect, the invention features a system including:

i) a frequency-tunable light source; ii) an interferometer which during operation directs different portions of an optical wave front derived from the light source to multiple surfaces and recombines the different portions to form an optical interference image; a multi-element photo-detector positioned to measure an interference signal at different locations of the optical interference image in response to varying the frequency of the light source; and iii) an electronic controller coupled to the light source and the photo-detector. During operation the controller: i) varies the frequency of the light source at each of multiple constant tuning rates; ii) for each constant frequency tuning rate, records an interference signal at at least one location of the optical interference image in response to the varying frequency and transforms the interference signal to produce a corresponding spectrum; iii) identifies a peak corresponding to a pair of the multiple surfaces in at least one spectrum; iv) selects a frequency tuning rate based on a spectral coordinate of the peak; and v) records an interference signal at a plurality of locations of the optical interference image in response to varying the frequency at the selected tuning rate.

In general, in another aspect, the invention features a system including: i) a frequency-tunable light source; ii) an interferometer which during operation directs different portions of an optical wave front derived from the light source to multiple surfaces and recombines the different portions to form an optical interference image; a multi-element photo-detector positioned to measure an interference signal at different locations of the optical interference image in response to varying the frequency of the light source; and iii) an electronic controller coupled to the light source and the photo-detector. During operation the controller: i) varies the frequency of the light source over a range of tuning rates; ii) records an interference signal for at least one of the locations in response the varying the frequency over the range of tuning rates; iii) monitors a reference phase from a reference cavity produced in response to an additional portion of the optical wave front; and iv) transforms the interference signal for the at least one location into an optical path length (OPL) domain based on the monitored reference phase to produce a spectrum having a peak at an OPL corresponding to a pair of the multiple surfaces.

Embodiments of any of the three system aspects described above may include any of the corresponding features described above in connection with the three method aspects.

The invention can provide any of the advantages enjoyed by wavelength tuning PSI, as disclosed in U.S. Application Ser. Nos. 60/252,116 and 09/919,511.

Alternatively, or additionally, embodiments of the invention can increase automation of PSI systems that utilize PSI algorithms and/or FTPSI techniques because they do not require the user to input a nominal OPL and/or tuning rate.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

In order to accurately characterize one or more surfaces in an interferometric cavity defined by multiple pairs of surfaces using PSI, it is preferable to set the tuning rate to a rate appropriate for the cavity OPL. When analyzing PSI interferograms using a PSI algorithm, an appropriate tuning rate is one that phase shifts the contribution from a cavity of interest by an amount appropriate for the PSI algorithm being used. When using FTPSI, an appropriate tuning rate is one that is sufficiently high to resolve the OPL of the cavity of interest, but is low enough to avoid aliasing.

In preferred embodiments, the described methods are implemented for single interferometry cavity systems. In single cavity systems, the instrument can operate identically to a conventional PSI tool (i.e., at any suitable separation of the cavity surfaces and without needing additional OPL information). The described methods can also be adapted to interferometer cavities produced from more than two surfaces (i.e., systems including multiple two surface cavities). However, in multiple cavity systems, the surface separations should be set appropriately to minimize spectral overlap.

Figure 1:
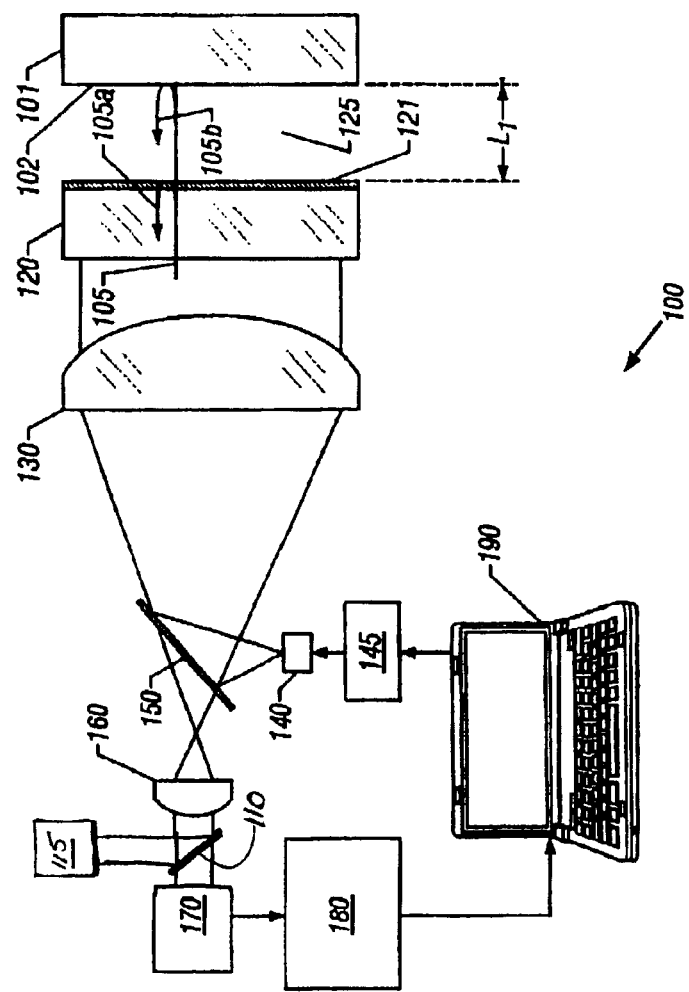
FIG. 1 is a schematic diagram of an interferometry system.

A schematic diagram of an interferometry system 100 is shown in FIG. 1. System 100 is adapted to measure the optical interference between reflections from the front surface 102 of measurement object 101 (e.g., an optical flat) and from a surface 121 of a reference object 120. Reference object 120 may be, for example, a reference flat having a well-characterized surface. Surface 102 is separated from surface 121 by a gap 125. System 100 includes a mount for positioning object 101 relative to reference object 120, and a computer 190. System 100 additionally includes a tunable light source 140 (e.g., a laser diode), a driver 145 connected to light source 140 for adjusting the optical frequency of its output, a beam splitter 150, a collimating optic 130, an imaging optic 160, a CCD camera 170, and a frame grabber 180 for storing images detected by camera 170. In some embodiments, a single device can perform both control and measurement functions (e.g., frame grabber 180 may be incorporated in computer 190). Driver 145 tunes the optical frequency ν of light 105 from light source 140 at a desired tuning rate, $\dot{\nu}$, through a frequency range $\Delta\nu$ about a nominal optical frequency of $\nu_0$.

During operation, controller 190 causes driver 145 to control the optical frequency of light 105 emitted by light source 140 and causes frame grabber 180 to store an image of the optical interference detected by CCD camera 170 for each of the specified optical frequencies. Frame grabber 180 sends each of the images to controller 190. Although CCD camera 170 and frame grabber 180 acquire interference signals from multiple pixels, it is only necessary to analyze the interference signal from one pixel in order to determine an appropriate tuning rate for PSI. Naturally, the interference signal from more than one pixel can be analyzed, e.g., for improving statistical accuracy when determining the tuning rate.

During operation, light source 140 directs light having an optical frequency ν to beam splitter 150, which then directs the light to collimating lens 130 to collimate the light into a plane field. Optionally, a second beamsplitter 110 directs a portion of the light to an optical frequency monitor 115, described further below with reference to FIG. 5. Surface 121 reflects a first portion of the light to form a first reference wavefront 105a, and surface 102 of object 101 reflects an additional portion of light to form wavefronts 105b. Lenses 130 and 160 then image wavefronts 105a and 105b onto CCD camera 170 where they form an optical interference pattern. The optical interference pattern can also includes contributions from higher order reflections within the cavity. Higher order reflections can include, for example, interference between light reflecting from surface 121 and light that reflects first off surface 102, then by surface 121, and then again by surface 102.

Figure 2:
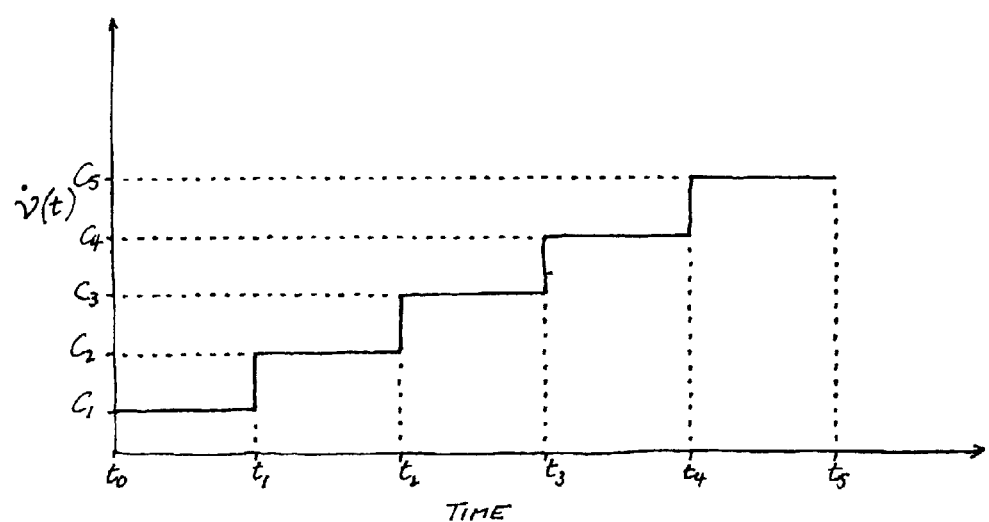
FIG. 2 is plot showing tuning rate vs. time for a tuning profile having a series of constant tuning rates.

In a first embodiment, controller 190 causes driver 145 to ramp the optical frequency from a low frequency to a high frequency using a series of constant tuning rates. In other words, for each constant tuning rate, the frequency varies linearly with time. This tuning rate profile can be expressed mathematically as $$\dot{\nu}(t) = \begin{cases} C_1 & t - t_0 \to t_1 \\ C_2 & t = t_1 \to t_2 \\ \vdots & \\ C_N & t = t_{N-1} \to t_N \end{cases} \quad (2)$$

where each $C_i$ is a constant. FIG. 2 shows a plot of an example of such a tuning rate profile, in which the five different tuning rates are used (i.e., N=5).

The lower tuning rate limit (e.g., $C_1$ in FIG. 2) can be set to accommodate the largest possible cavity OPL. Starting at the lower limit also reduces the possibility of falsely identifying an aliased peak. The detector acquires a sufficient number of frames at this tuning rate, and the controller performs a frequency transform on the interference signal corresponding to the frame intensity at acquired at a detector pixel. Typically, a sufficient number of frames are acquired so that the frequency transform provides a useful spectrum. For example, where the frequency transform is an FFT, 16 or more frames are usually sufficient. Prior to transforming the interference data, a DC term can be subtracted from the data.

Once the data has been transformed, the frequency spectrum is studied for the presence of a peak. One method for identifying a peak is to search for a frequency where the optical power is above a certain threshold power. For example, where a FFT is used, a power spectrum can be determined by summing the square of the imaginary and real components for each frequency bin of the FFT. A search of the frequency bins locates the bin with the highest power. In some embodiments, the controller calculates the weighted average frequency, F, for the three bins straddling the bin with the highest power, and sums of the powers in these three bins to determine an optical power parameter, P. The weighted average frequency can be expressed as $$F = \frac{\sum_{j=\max-1}^{\max+1} PSD_j \cdot f_j}{\sum_{j=\max-1}^{\max+1} PSD_j}, \quad (4)$$

where j refers to the bin number, $PSD_j$ is the optical power at the j-th bin, and $f_j$ is the frequency corresponding to the j-th bin. Similarly, the optical power parameter can be expressed as $$P = \sum_{j=\max-1}^{\max+1} PSD_j. \quad (5)$$

The values of F and P can then be used to determine the acceptability of the peak by comparing the power parameter to a user defined threshold value, and the frequency to a frequency range corresponding to a reasonable range for the cavity OPL.

One way to determine a threshold value is from the system's digitization precision, DP, which is typically expressed as $2^b$, where b is the number of bits produced from the analog to digital conversion. In some embodiments, the power of a suitable peak should be greater than a particular fraction of the power expected for the current digitization precision. For example, typical instruments have a DP of 256. The expected power produced from an FFT of a sinusoidal signal with 100% contrast can be found from the formula $$P_{expected} = \frac{3DP^2}{\alpha},$$

where $\alpha$ refers to the number of frames acquired (e.g., $\alpha$ is greater than or equal to 16 for most FFT implementations). The threshold power can then be set as a fraction of the expected power (e.g., 5% of the expected power).

If no peak is found for the spectrum corresponding to the first tuning rate (e.g., $C_1$ in FIG. 2), the system acquires data at the next tuning rate (e.g., to $C_2$), and analyzes this data in the same manner as for the data acquired at the first tuning rate. Data sets at subsequent tuning rates are acquired and analyzed until a suitable peak is identified.

The following is an example intended to clarify the first embodiment. In the example, the camera was assumed to have a frame rate, $f_s$, of 30 Hz, and the maximum tuning range, $\Delta v_{max}$, of the light source is 80 GHz. A 16 frame acquisition at each tuning rate is also assumed (i.e., $\alpha$=16). Note that for a constant tuning rate, $$\dot{v} = \frac{f_s \cdot \Delta v}{\alpha}, \quad (6)$$

so the task of determining an appropriate tuning rate, $\dot{v}$, corresponds to determining an appropriate tuning range, $\Delta v$.

A 16 frame acquisition takes only ½ second for a 30 Hz camera, so when the number of tuning rates was small, the method was reasonably fast.

A minimum tuning rate number was estimated from the range of frequencies implied by the minimum and maximum OPL's. The tuning range required to produce an interference frequency below Nyquist for a 6 meter OPL is 200 MHz, so the frequency dynamic range that should be spanned by the series of interferograms is $$\frac{\Delta v_{max}}{\Delta v} = \frac{80 \text{ GHz}}{200 \text{ MHz}} = 400.$$

It was empirically determined that a reliable frequency dynamic range for a single 16-point FFT is between 0.163 and 0.838 of Nyquist (a range factor of 5.14). In order to assure a solution is found for the full dynamic range of 400, and allowing a small amount of spectral overlap between individual acquisitions, 5 tuning ranges were selected with individual ranges determined by the formula $\Delta v \cdot DR^m = 200 \cdot (4.5)^m$ MHz, where DR is the dynamic range of the FFT (i.e., DR=4.5 is the dynamic range of a single 16-point FFT) and m (the tuning range parameter) is incremented by one for each sequential acquisition.

Figure 3:
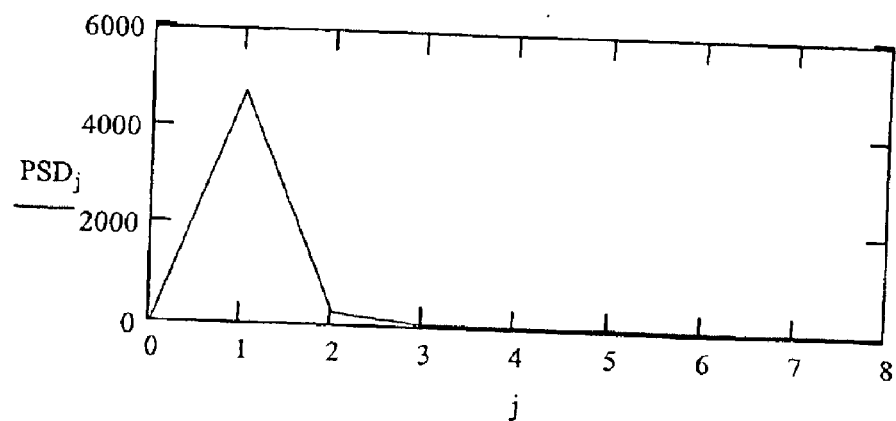
FIG. 3 is a plot showing an optical power spectrum for a first tuning rate in an exemplary system.

In the example, the OPL of interest was set at 343 mm and the frequency for subsequent characterization was selected to be ½ Nyquist (which implied a 90 degree phase increment so standard PSI algorithms could be used). Upon initialization, the controller set the threshold power to 5%, the number of data points per tuning rate to 16, the digitization precision to 240, and the tuning range parameter, m, to zero. The first tuning range is then equal to $200(4.5)^0=200$ MHz. The controller set the tuning range to 200 MHz and acquired 16 frames of data. After subtracting the DC term from the intensity pixel history (determined from the intensity average of all the frames), the controller calculated the FFT and power spectrum. The resulting power spectrum is shown in FIG. 3.

The peak bin was at j=1 and the first three bins had powers of 0, 4704 and 246, respectively, which produced a weighted average frequency F=0.131 and an optical power parameter P=4953. Though the power was sufficient (i.e., greater than the threshold power, which was $$\left(\text{i.e., greater than the threshold power, which was}\right.$$

$$\left.0.05 \times P_{expected} \quad \frac{0.05 \times 3 \times 240^2}{16} = 540\right),$$

mainly due to spillover from the remaining DC, the frequency was too low (less than 0.163). Therefore, the loop index, m, was incremented by 1, and the tuning range was reset to $200 \times 4.5^1 = 900$ MHz. The system acquired 16 frames of data at the new tuning range.

Figure 4:
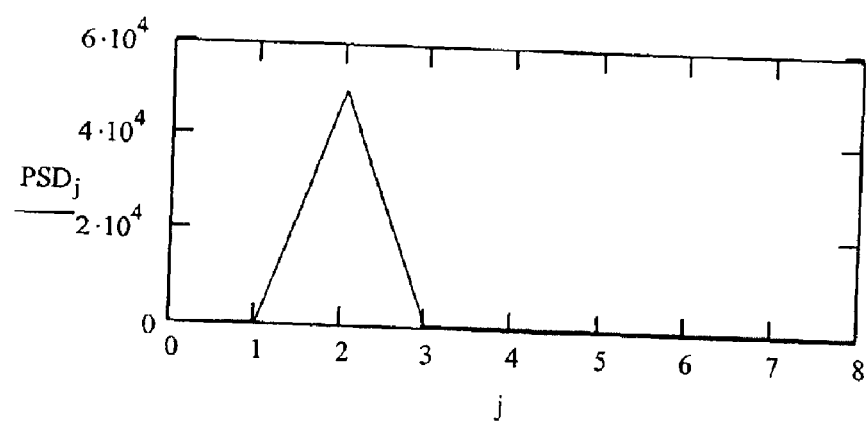
FIG. 4 is a plot showing an optical power spectrum for a second tuning rate for the same exemplary system as for FIG. 3.

FIG. 4 shows the adjusted power spectrum for data acquired for the new tuning range after subtracting the DC term from the intensity pixel history. The peak bin was at j=2 and the $1^{st}$, $2^{nd}$ and $3^{rd}$ bins had powers of 54, 49910 and 316, respectively, which produced a weighted average frequency F=0.251 and an optical power parameter P=50280. The power was above threshold, and the frequency was also within the target range (i.e., 0.163<0.251<0.838). Thus, the peak in FIG. 4 was suitable for determining a tuning range with which to study the cavity. For this example, the tuning range needed to produce a frequency of 0.50 was $$900 \frac{0.50}{0.251} = 1.793 \text{ GHz}.$$

For the 30 Hz frame rate, this corresponds to a tuning rate of 3.361 GHz per second.

In some embodiments, the tuning rate is increased by a multiplicative factor each time a satisfactory peak is not found. The appropriate multiplicative factor depends on the number of samples acquired during each individual tune and the range of reliable frequencies that can be extracted from the frequency transform used. In general, between acquisitions, the tuning rate can be increased (or decreased) to any rate appropriate for the frequency range of the source. The series of tuning rates can be selected to provide a maximum dynamic range of interference frequencies using a minimum number of tuning rates.

In the above-described embodiment, data acquired at one tuning rate is analyzed before acquiring data at additional tuning rates. However, in other embodiments, the system can acquire data at more than one tuning rate before analyzing any data.

Once a peak of suitable power is found, the controller determines the peak frequency from the transform and calculates the appropriate tuning rate for the PSI algorithm to be used to characterize the cavity.

In some embodiments, system 100 can include a wavelength monitor (e.g., wavelength monitor 115 shown in FIG.

Figure 5:
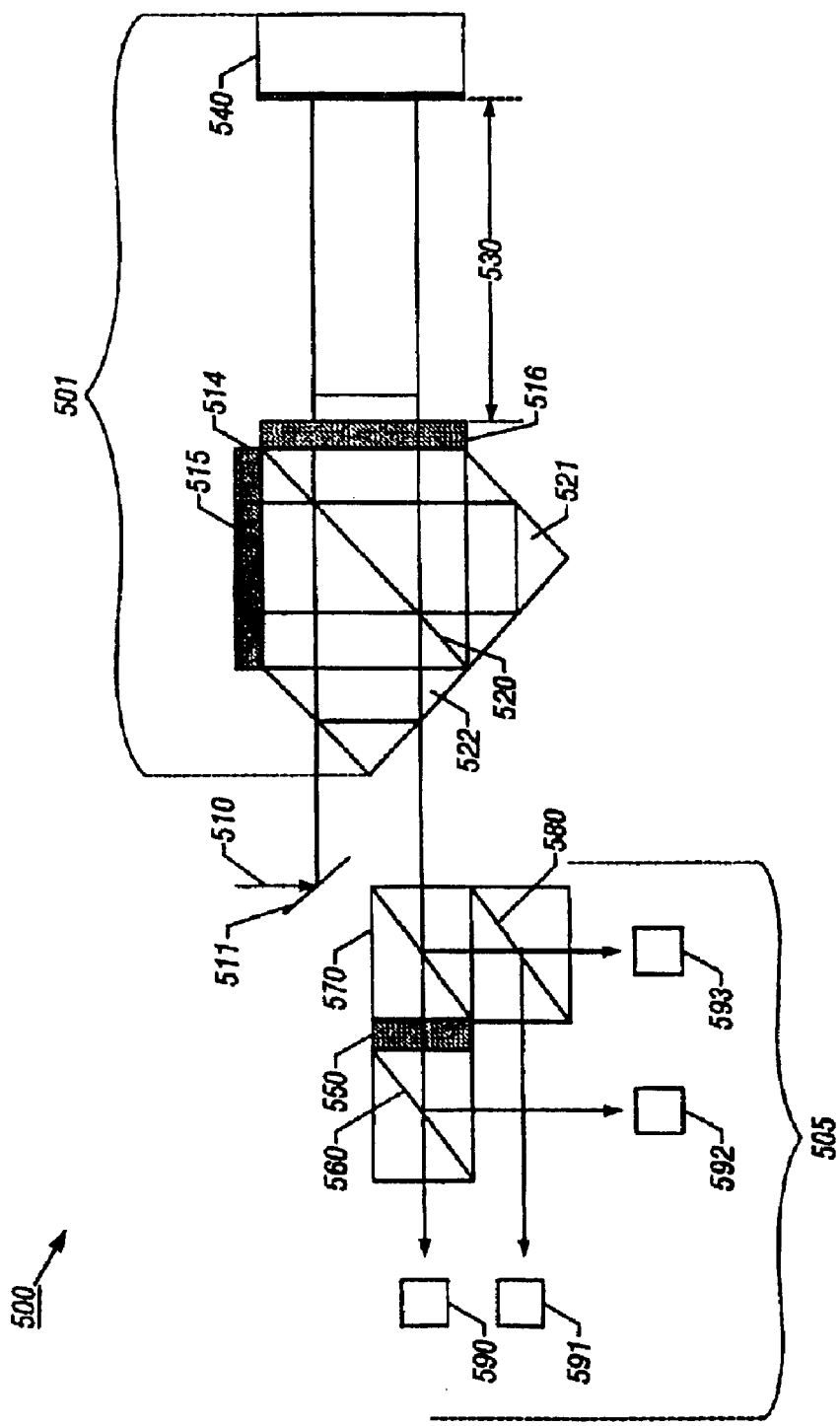
FIG. 5 is a schematic diagram of a wavelength monitor.

1). An example of a wavelength monitor, monitor 500, is shown in FIG. 5. Monitor 500 is a homodyne interferometer that includes a high stability plane mirror interferometer (HSPMI) 501 and a quadrature detector 505. HSPMI 501 includes a polarizing beamsplitter 520, reflectors 515 and 540, quarter-wave plates 514 and 516, corner cube retro-reflector 521, and roof prism (or split retro-reflector) 522. Quadrature detector 505 includes four detectors 590, 591, 592, and 593, beamsplitter 570, polarizing beamsplitters 560 and 580, and quarter-wave plate 550. The whole assembly is ideally mounted on a low expansion plate, for example, one formed from Zerodur or Invar. If necessary, the plate can be thermally controlled with a resistive heater element.

A polarized input beam 510 from light source 140 is directed into HSPMI 501 via reflector 511. Roof prism 522 is positioned below the plane of the page, such that the input beam to the interferometer passes over it. In some embodiments, the input beam is linearly polarized at 45°, or it can be circularly polarized. Beamsplitter 520 splits the input beam into orthogonally polarized reference and measurement beams. The reference beam is twice directed between mirror 515 and cube-corner retro-reflector 521 before being directed to roof prism 522. Similarly, the measurement beam is twice directed between mirror 540 and cube-corner retro-reflector 521. Following the second pass to mirrors 515 and 540, respectively, cube-corner retro-reflector 521 lowers the reference and measurement beams to the plane of roof prism 522, which causes the beams to make two additional passes to mirrors 515 and 540. Thereafter, the beams are recombined into an output beam, which is directed to quadrature detector 505.

The beamsplitting plane of the Quadrature detector 505 is oriented at 45° relative to the two polarizations emitted from HSPMI 501. It therefore mixes the polarizations and produces a beam containing an interference signal proportional to the OPL of the monitor and the optical frequency tuning rate. Quadrature detector 505 further produces four replicas of the interference beam with the interference phase of each replica shifted by 90 degrees. By monitoring the intensity, $D_x$ (where x refers to the detector), of each replica during the tune, the phase of the monitor cavity can be determined as $$\phi = \arctan\left[\frac{D_{590} - D_{592}}{D_{593} - D_{591}}\right], \tag{6}$$

from which the overall interferometric phase shift at each time sample can be determined.

In other embodiments, the optical frequency monitor is not limited to the homodyne interferometer described above. Generally, any monitor capable of determining wavelength and optical frequency tuning rate to the required accuracies during the FTPSI measurement process is acceptable. For example, a heterodyne interferometer could perform this function.

The inclusion of a wavelength monitor in FTPSI applications provides a convenient signal by which the appropriate tuning rate can be determined. It is useful to recognize that determining an appropriate tuning rate corresponds to determining the OPL of the interferometer cavity. The OPL transform concept, which is described in detail in U.S. patent application Ser. No. 10/304,209, entitled "PHASE SHIFTING INTERFEROMETRY METHOD AND SYSTEM," filed Nov. 26, 2002, is a natural tool for evaluating the cavity OPL.

Figure 6:
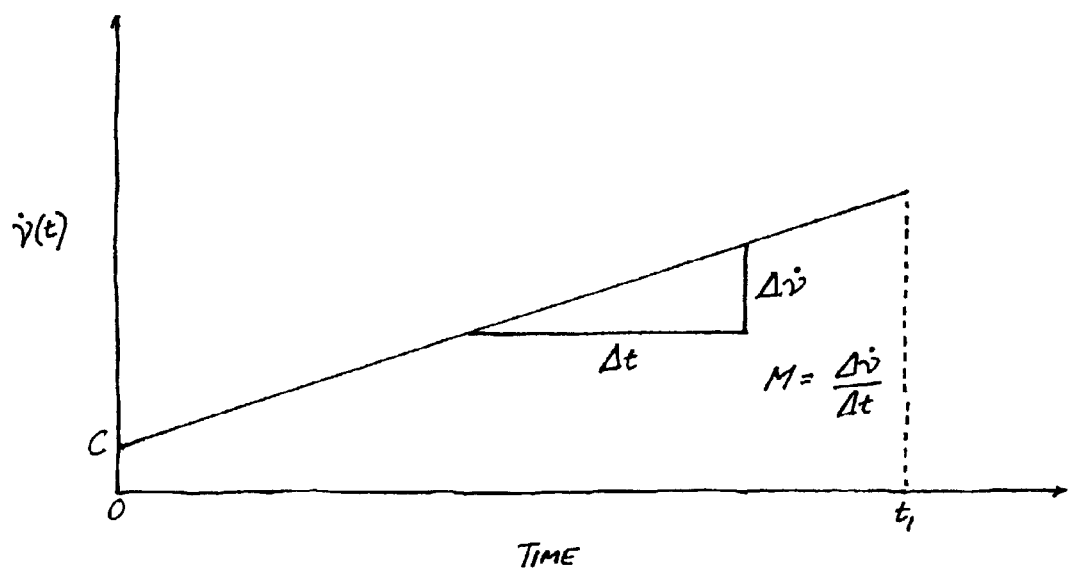
FIG. 6 is a plot showing tuning rate vs. time for a tuning profile having a linearly increasing tuning rate.

In a second embodiment, the optical frequency is monitored with the wavelength monitor. To determine an appropriate tuning rate for PSI, the system acquires an interference signal using a linearly varying tuning rate. In other words, during the tune, the frequency varies quadratically with time. Mathematically, this tuning rate profile can be expressed as $$\dot{v}(t) = Mt + C, \tag{7}$$

where M and C are constants. A linear tuning rate profile is illustrated by the plot shown in FIG. 6. The tuning rate profile starts with an initial tuning rate C, and produces a total optical frequency excursion of $\Delta v$ during the time necessary to acquire N detector samples. Thus, three parameters (e.g., C, N and $\Delta v$ (or M)) should be defined, with the constraint that the total optical frequency excursion $\Delta v$ be less than the maximum allowable tuning range of the source, $\Delta v_{max}$.

Simulations have been performed to illustrate this embodiment and to better understand the relationship between these parameters. Although these simulations refer to specific values for these and other parameters, and to specifications associated with the interferometry system, implementations of this method are not limited to these values. In general, a user can select parameter values based on the specifics of their system.

For the simulations, N=60 was assumed throughout. N=60 corresponds to a one second total acquisition time for a 60 Hz camera. In general, for rapid calibration, N should be kept small. However, too few samples can produce insufficient frequency resolution and unacceptable noise, especially for large cavities.

Because of the finite tuning range and effective source linewidth, the instrument specifies maximum and minimum cavity lengths $D_{max}$ and $D_{min}$, where $D_{min}$ is determined from the maximum available tuning range. An estimate for the initial tuning rate, C, can be found using the maximum cavity length and assuming, e.g., $\pi/4$ phase increment per sample, producing $$C = \frac{cf_s}{8D_{max}} \tag{8}$$

where $f_s$ is the detector frame rate. This formula is obtained using the tuning rate given by equation 1 and setting t=0 in equation 7.

To determine M, one can integrate equation 7 from 0 to t, which yields a formula for the tuning rage. Setting $t=N/f_s$, this formula can be expressed as $$\Delta v = v - v_0 = C\frac{N}{f_s} + \frac{M}{2}\left(\frac{N}{f_s}\right)^2 < \Delta v_{max}. \tag{9}$$

Therefore, $$M < 2\Delta v_{max}\left(\frac{f_s}{N}\right)^2 - 2C\frac{f_s}{N} \tag{10}$$

To get a sense of the magnitudes of these quantities, it is instructive to calculate M and C based on some reasonable system parameters. For example, if N=60, $f_s$=30 Hz, $\Delta v_{max}$= $\Delta v$=80 GHz, and $D_{max}$=6 meters, then C=200 MHz/sec and M=34 GHz/s². The values obtained from simulations can vary significantly from these estimates, but these estimates provided reasonable starting points.

The constant tuning rate used for each acquisition in the first embodiment maps the OPL from each elemental two-surface cavity to a particular interference frequency, allowing the frequency spectrum and phase to be determined with a discrete Fourier Transform (DFT). Because each elemental two-surface cavity OPL is still a constant of the system, a transform that measures the OPL directly can be used to calculate the OPL directly. This type of transform is referred to as an OPL transform. To define this transform, start with the integral representation of the Fourier transform.

$$F(f) = \int_{-\infty}^{\infty} I(t)W(t)\exp(-i2\pi ft)\,dt \qquad (11)$$

where I(t) is the intensity variation, W(t) is a window function and f is the frequency being analyzed. The window function, W(t), is usually selected to suppress contributions to the phase evaluation from additional frequencies far from f, and from the effect of finite observation intervals. Examples of Fourier windows include Hamming windows and Tukey windows. The Tukey window can be advantageous in embodiments having one or more additional frequency peaks close to f as the taper width of the window can be chosen to effectively zero-weight these additional frequencies. In an interferometer, the frequency f is the test cavity interference frequency given by equation 1.

For an FTPSI apparatus that includes a wavelength monitor cavity having a known fixed OPL, $D_M$, the monitor allows one to measure $\dot{v}$, which is common to both cavities.

$$\dot{v} = \frac{cf_M}{D_M} \qquad (12)$$

Combining equations 1, 11 and 12 one obtains, $$F(D) = \int_{-\infty}^{\infty} I(t)W(t)\exp\left(-i2\pi \frac{D}{D_M}f_M t\right)dt. \qquad (13)$$

Noting that the monitor phase evolution $\phi_M$ is $$\phi_M = 2\pi f_M t \qquad (14)$$

and affecting the change of variables t→$\phi_M$ $$F(D_T) = \int_{-\infty}^{\infty} I(\varphi_M)W(\varphi_M)\exp\left(-i\frac{D_T}{D_M}\varphi_M\right)d\varphi_M \qquad (15)$$

Converting from continuous time to discrete time signals one obtains the OPL transform, $$OPL(D) = \sum_{j=0}^{N-1} I_j W_j \exp\left(-i\varphi_{Mj}\frac{D}{D_M}\right)\Delta\varphi_{Mj}. \qquad (16)$$

Analogously to the constant tuning rate case, an OPL spectrum, S, can now be generated from the intensity time history of a single pixel in the test cavity (the calibration pixel) via;

$$S(D) = |OPL(D)|^2 \qquad (17)$$

Each peak corresponds to the OPL of a particular cavity. Once the peaks in the spectrum are identified, the phase at each pixel at a particular OPL peak position determines the spatial phase variation of the corresponding cavity. The spatial phase variation is calculated using $$\phi(D) = \tan^{-1}[OPL(D)] \qquad (18)$$

for the pixel(s) in the test region.

To explore the sensitivity of the method to changes in C, M and N, a simulation was developed. The simulation generated the intensity history of a pixel from a cavity of specified OPL due to a linear tuning rate and a corresponding phase evolution from a monitor of known OPL. The test cavity OPL was then determined by application of equation 17 and searching for the highest peak in the spectrum. The simulation included typical error producing mechanisms such as digitization error and reduced contrast.

After a number of trials assuming $f_s$=60 Hz, $D_{min}$=8 millimeters and $D_{max}$=6 meters the following values were selected: N=60; C=2 GHz/sec; $\Delta v$=15 GHz; and M=26 GHz/sec$^2$. These values produced no catastrophic OPL prediction over the full cavity range in the simulation. For this simulation, all errors were less than two percent of the actual OPL for cavities greater than 15 millimeters. For cavities less than 15 millimeters, the errors were less than 10 percent.

Although the above-described second embodiment utilizes a linearly increasing tuning profile, other tuning rate profiles can also be used. For example, in some embodiments, a linearly decreasing tuning rate profile can be used. More generally, tuning rate profiles need not be linear, non-linear tuning rate profiles can also be used (e.g., quadratic or higher order polynomial tuning rate profiles). In general, provided wavelength of the light source can be accurately monitored during the tune so that an OPL transform can be used, any tuning rate can be employed.

Once an appropriate tuning rate is determined, the interferometry system can acquire PSI data for cavity characterization (e.g., phase extraction and surface profiling). Data acquired while phase shifting using the determined tuning rate can be analyzed using, e.g., a PSI algorithm or FTPSI techniques.

In the case where the data is analyzed using a PSI algorithm, the tuning rate is determined so that the interference signal will vary at a particular frequency which corresponds to a set phase shift between each intensity value. One such PSI algorithm is the following thirteen-frame algorithm:

$$\tan(\varphi) = \frac{-3(g_0-g_{12})-4(g_1-g_{11})+12(g_3-g_9)+21(g_4-g_8)+16(g_5-g_7)}{-4(g_1+g_{11})-12(g_2+g_3+g_9+g_{10})+16(g_5+g_7)+24g_6} \qquad (19)$$

where for each spatial coordinate (x,y), $\phi$ is the phase determined by the PSI algorithm and $g_j$ is the intensity value of the "$j^{th}$" image, and where the wavelength shift $\Delta\lambda$ between consecutive images corresponds to a phase shift for the frequency of interest substantially equal to $\pi/4$. Accordingly, the PSI algorithm provides the phase map $\phi(x,y)$ for the cavity.

When using FTPSI techniques, a phase can be extracted at each spatial coordinate (x,y) from the cavity OPL and tuning rate selected to acquire the data. For example, were the selected tuning rate is constant, once $f_C$, the interference frequency for the cavity, has been determined, the interferometric phase of the cavity can be recovered from the complex amplitude of the Discrete Fourier Transform (DFT) of the interference, evaluated at the representative first-order frequency, $f_C$, for that cavity:

$$\varphi = \tan^{-1}\left(\frac{\text{Im}(DFT(f_C))}{\text{Re}(DFT(f_C))}\right), \quad (20)$$

where $$DFT(f_C) = \sum_{j=0}^{N-1} I_j W_j \exp\left[i\frac{2\pi j f_C}{f_S}\right]. \quad (21)$$

In equation 21, $I_j$ is the intensity sample measured at the $j^{th}$ optical frequency of the optical frequency tune. N is the total number of intensity samples acquired. $W_j$ are the sampling weights associated with a Fourier window, W, and $f_s$ is the sampling rate. Fourier window, W, is usually selected to suppress contributions to the phase evaluation from additional frequencies far from $f_C$, and from the effect of finite observation intervals. In other embodiments, where a non-constant tuning rate is used, a phase profile can be extracted using an OPL transform Extraction of the phase, $\phi$, for each CCD pixel gives a phase distribution $\phi(x,y)$ (i.e., phase map) for the cavity. In either case, a surface profile (e.g., the profile of surface 102 in FIG. 1), can be determined from the phase via the relationship:

$$\varphi(x,y) = 2pknL(x,y) + \Phi = 2pnL(x,y)\frac{2\pi v}{c} + \Phi, \quad (22)$$

where v is the optical frequency of the light, c is the speed of light, k is the wavenumber of the light, p is the number of times that the light reflects from the surface, and $\Phi$ is an overall constant phase.

In any of the embodiments described above, the controller can include hardware, software, or a combination of both to control the other components of the system and to analyze the phase-shifted images to extract the desired information about the measurement object. The analysis described above can be implemented in computer programs using standard programming techniques. Such programs are designed to execute on programmable computers each comprising a processor, a data storage system (including memory and/or storage elements), at least one input device, at least one output device, such as a display or printer. The program code is applied to input data (e.g., phase-shifted images from a CCD camera) to perform the functions described herein and generate information (e.g., the topography of a selected surface), which is applied to one or more output devices. Each computer program can be implemented in a high-level procedural or object-oriented programming language, or an assembly or machine language. Each such computer program can be stored on a computer readable storage medium (e.g., CD ROM or magnetic diskette) that when read by a computer can cause the processor in the computer to perform the analysis described herein.

A number of embodiments of the invention have been described. Nevertheless, it will be understood that various modifications may be made without departing from the spirit and scope of the invention.

What is claimed is:

1. An interferometry method comprising:

forming an optical interference image by combining different portions of an optical wave front reflected from multiple surfaces;

varying a frequency of the optical wave front at a plurality of different frequency tuning rates;

recording an interference signal at at least one location of the optical interference image in response to the varying of the frequency;

transforming at least a portion of the interference signal for the at least one location to produce a spectrum having a peak at a spectral coordinate corresponding to a pair of the multiple surfaces;

selecting a frequency tuning rate based on the spectral coordinate of the peak; and recording an interference signal at multiple locations of the optical interference image in response to varying the frequency at the selected tuning rate.

2. The method of claim 1, wherein at least one of the different tuning rates is sufficiently large to resolve an optical path length corresponding to the pair of surfaces.

3. The method of claim 1, wherein at least one of the different tuning rates is smaller than a maximum tuning rate corresponding to a Nyquist sampling rate for the pair of the multiple surfaces.

4. The method of claim 1, wherein the varying of the frequency of the optical wave front comprises varying the frequency at a first constant frequency tuning rate.

5. The method of claim 4, wherein the varying of the frequency of the optical wave front further comprises varying the frequency at one or more additional constant frequency tuning rates different from the first constant frequency tuning rate.

6. The method of claim 5, wherein the interference signal is transformed for each of the different constant tuning rates to produce a corresponding spectrum, and wherein the peak corresponding to the pair of multiple surfaces is present in at least one of the spectrums.

7. The method of claim 1, wherein the spectrum is produced by transforming the interference signal into the frequency domain.

8. The method of claim 1, wherein the spectrum is produced by transforming the interference signal into an optical path length (OPL) domain.

9. The method of claim 1, wherein the varying of the frequency of the optical wave front comprises linearly varying the frequency tuning rate.

10. The method of claim 9, wherein the varying of the frequency of the optical wave front further comprises non-linearly varying the frequency tuning rate.

11. The method of claim 1, further comprising monitoring a reference phase from a reference cavity produced in response to an additional portion of the optical wave front.

12. The method of claim 11, wherein the spectrum is produced by transforming the interference signal into an optical path difference length (OPL) based on the monitored reference phase.

13. The method of claim 12, wherein the spectrum S corresponds to $S(D)=|OPLT(D)|^2$, where D is a variable for optical path difference and OPLT(D) is an OPD transform, which can be expressed as:

$$OPLT(D) = \sum_{j=0}^{N-1} I_j W_j \exp\left(-i\varphi_{Mj}\frac{D}{D_M}\right)\Delta\varphi_{Mj},$$

where there are N increments to the varying of the optical wave frequency, j is an index for the N increments, $I_j$ is the interference signal at increment j, $W_j$ is a value for a weighting function at increment j, $D_M$ corresponds to an optical path length of the reference cavity, $\phi_{Mj}$ is the monitored reference phase at increment j, and $\Delta\phi_{Mj}$ is an increment in the monitored reference phase corresponding to increment j.

14. The method of claim 13, wherein the varying of the frequency of the optical wave front further comprises non-linearly varying the frequency tuning rate.

15. The method of claim 12, wherein the varying of the frequency of the optical wave front comprises linearly varying the frequency tuning rate.

16. The method of claim 1, wherein the spectral coordinate of the peak corresponding to the pair of the multiple surfaces corresponds to the spectral coordinate at which the spectrum has the highest power.

17. The method of claim 1, wherein the selected tuning rate is a constant tuning rate.

18. The method of claim 1, wherein the selected tuning rate is one of the plurality of different tuning rates.

19. The method of claim 1, wherein the selected tuning rate is different from the plurality of different tuning rates.

20. The method of claim 1, further comprising extracting a phase for each of the multiple locations based on the interference signal for the selected tuning rate.

21. The method of claim 20, further comprising calculating a surface profile for at least one of the pair of surfaces based on the extracted phases.

22. The method of claim 20, further comprising calculating an optical thickness profile for the pair of surfaces based on the extracted phases.

23. The method of claim 20, wherein the extracting of the phases comprises applying a PSI algorithm to the interference signal for the selected tuning rate at each of the multiple locations.

24. The method of claim 20, wherein the extracting of the phases comprises transforming the interference signal for the selected tuning rate for each of the multiple locations and determining a phase of the transformed signal at a transform coordinate corresponding to the pair of multiple surfaces for each of the multiple locations.

25. The method of claim 1, wherein the multiple surfaces consist of two surfaces.

26. The method of claim 1, wherein the multiple surfaces comprise three or more surfaces.

27. An interferometry method comprising:
forming an optical interference image by combining different portions of an optical wave front reflected from multiple surfaces;
varying a frequency of the optical wave front at each of multiple constant tuning rates;
for each constant frequency tuning rate, recording an interference signal at at least one location of the optical interference image in response to the varying frequency and transforming the interference signal to produce a corresponding spectrum;
identifying a peak corresponding to a pair of the multiple surfaces in at least one spectrum;
selecting a frequency tuning rate based on a spectral coordinate of the peak; and
recording an interference signal at a plurality of locations of the optical interference image in response to varying the frequency at the selected tuning rate.

28. The method of claim 27, wherein the multiple constant tuning rates become consecutively larger in absolute magnitude.

29. The method of claim 27, wherein the multiple constant tuning rates includes a tuning rate sufficiently large to resolve an optical path length corresponding to the pair of surfaces and a tuning rate smaller than a maximum tuning rate corresponding to a Nyquist sampling rate for the pair of the multiple surfaces.

30. The method of claim 27, further comprising extracting a phase for each of the multiple locations based on the interference signal for the selected tuning rate.

31. An interferometry method comprising:
forming an optical interference image by combining different portions of an optical wave front reflected from multiple surfaces;
varying a frequency of the optical wave front over a range of tuning rates recording an interference signal at at least one location of the optical interference image in response to the varying frequency;
monitoring a reference phase from a reference cavity produced in response to an additional portion of the optical wave front; and
transforming the interference signal for the at least one location into an optical path length (OPL) domain based on the monitored reference phase to produce a spectrum having a peak at an OPL corresponding to a pair of the multiple surfaces.

32. The method of claim 31, wherein the varying of the frequency of the optical wave comprises linearly varying the tuning rate.

33. The method of claim 32, wherein the varying of the frequency of the optical wave further comprises nonlinearly varying the tuning rate.

34. The method of claim 31, wherein the range of tuning rates includes a tuning rate sufficiently large to resolve an optical path length corresponding to the pair of surfaces and a tuning rate smaller than a maximum tuning rate corresponding to a Nyquist sampling rate for the pair of the multiple surfaces.

35. The method of claim 31, wherein the spectrum S corresponds to $S(D)=|OPLT(D)|^2$, where D is a variable for optical path difference and OPLT(D) is an OPD transform, which can be expressed as:

$$OPLT(D) = \sum_{j=0}^{N-1} I_j W_j \exp\left(-i\varphi_{Mj}\frac{D}{D_M}\right)\Delta\varphi_{Mj},$$

where there are N increments to the varying of the optical wave frequency, j is an index for the N increments, $I_j$ is the interference signal at increment j, $W_j$ is a value for a weighting function at increment j, $D_M$ corresponds to an optical path length of the reference cavity, $\phi_{Mj}$ is the monitored reference phase at increment j, and $\Delta\phi_{Mj}$ is an increment in the monitored reference phase corresponding to increment j.

36. The method of claim 31, further comprising:
selecting a frequency tuning rate based on the OPL of the peak; and
recording an interference signal at a plurality of locations of the optical interference image in response to varying the frequency at the selected tuning rate.

37. The method of claim 36, wherein the selected tuning rate is a constant tuning rate.

38. The method of claim 36, further comprising extracting a phase for each of the multiple locations based on the interference signal for the selected tuning rate.

39. A system comprising:
a frequency-tunable light source;
an interferometer which during operation directs different portions of an optical wave front derived from the light source to multiple surfaces and recombines the different portions to form an optical interference image;
a multi-element photo-detector positioned to measure an interference signal at different locations of the optical interference image in response to varying the frequency of the light source; and an electronic controller coupled to the light source and the photo-detector, wherein during operation the controller:

i) varies the frequency of the light source at a plurality of different tuning rates;

ii) records an interference signal at least one of the locations in response to varying the frequency at the plurality of different tuning rates;

iii) transforms at least a portion of the interference signal corresponding to the plurality of different tuning rates to produce a spectrum having a peak at a spectral coordinate corresponding to a pair of the multiple surfaces;

iv) selects a frequency tuning rate based on the spectral coordinate of the peak;

v) varies the frequency of the light source at the selected frequency tuning rate; and vi) records the interference signal for each of the different locations of the optical interference image in response to varying the frequency at the selected frequency tuning rate.

40. The system of claim 39, wherein at least one of the different tuning rates is sufficiently large to resolve an optical path length corresponding to the pair of surfaces.

41. The system of claim 39, wherein at least one of the different tuning rates is smaller than a maximum tuning rate corresponding to a Nyquist sampling rate for the pair of the multiple surfaces.

42. The system of claim 39, wherein during operation the electronic controller produces the spectrum by transforming the interference signal into the frequency domain.

43. The system of claim 39, wherein during operation the electronic controller produces the spectrum by transforming the interference signal into an optical path length (OPL) domain.

44. The system of claim 39, further comprising a reference cavity, and during operation the electronic controller monitors a reference phase from the reference cavity produced in response to an additional portion of the optical wave front.

45. The system of claim 44, wherein during operation the electronic controller produces the spectrum by transforming the interference signal into an optical path length (OPL) domain based on the monitored reference phase.

46. The system of claim 45, wherein the spectrum S corresponds to $S(D)=|OPLT(D)|^2$, where D is a variable for optical path difference and OPLT(D) is a OPD transform, which can be expressed as:

$$OPLT(D) = \sum_{j=0}^{N-1} I_j W_j \exp\left(-i\varphi_{Mj}\frac{D}{D_M}\right)\Delta\varphi_{Mj},$$

where there are N increments to the varying of the optical wave frequencey, j is an index for the N increments, $I_j$ is the interference signal at increment j, $W_j$ is a value for a weighting function at increment j, $D_M$ corresponds to an optical path length of the reference cavity, $\phi_{Mj}$ is the monitored reference phase at increment j, and $\Delta\phi_{Mj}$ is an increment in the monitored reference phase corresponding to increment j.

47. The system of claim 39, wherein the spectral coordinate of the peak corresponding to the pair of the multiple surfaces corresponds to the spectral coordinate at which the spectrum has the highest power.

48. The system of claim 39, wherein the selected tuning rate is a constant tuning rate.

49. The system of claim 39, wherein the selected tuning rate is one of the plurality of different tuning rates.

50. The system of claim 39, wherein during operation the electronic controller further extracts a phase for each of the multiple locations based on the interference signal for the selected tuning rate.

51. The system of claim 50, wherein during operation the electronic controller further calculates a surface profile for at least one of the pair of surfaces based on the extracted phases.

52. The system of claim 50, wherein during operation the electronic controller further calculates an optical thickness profile for the pair of surfaces based on the extracted phases.

53. The system of claim 50, wherein during operation the electronic controller extracts the phases by applying a PSI algorithm to the interference signal for the selected tuning rate at each of the multiple locations.

54. The system of claim 50, wherein during operation the electronic controller extracts the phases by transforming the interference signal for the selected tuning rate for each of the multiple locations and determining a phase of the transformed signal at a transform coordinate corresponding to the pair of multiple surfaces for each of the multiple locations.

55. The system of claim 39, wherein the multiple surfaces comprise three or more surfaces.

56. A system comprising:

a frequency-tunable light source;

an interferometer which during operation directs different portions of an optical wave front derived from the light source to multiple surfaces and recombines the different portions to form an optical interference image;

a multi-element photo-detector positioned to measure an interference signal at different locations of the optical interference image in response to varying the frequency of the light source; and an electronic controller coupled to the light source and the photo-detector, wherein during operation the controller:

i) varies the frequency of the light source at each of multiple constant tuning rates;

ii) for each constant frequency tuning rate, records an interference signal at at least one location of the optical interference image in response to the varying frequency and transforms the interference signal to produce a corresponding spectrum;

iii) identifies a peak corresponding to a pair of the multiple surfaces in at least one spectrum;

iv) selects a frequency tuning rate based on a spectral coordinate of the peak; and v) records an interference signal at a plurality of locations of the optical interference image in response to varying the frequency at the selected tuning rate.

57. The system of claim 56, wherein the multiple constant tuning rates becomes consecutively larger in absolute magnitude.

58. The system of claim 56, wherein the multiple constant tuning rates includes a tuning rate sufficiently large to resolve an optical path length corresponding to the pair of surfaces and a tuning rate smaller than a maximum tuning rate corresponding to a Nyquist sampling rate for the pair of the multiple surfaces.

59. The system of claim 56, wherein during operation the electronic controller further extracts a phase for each of the multiple locations based on the interference signal for the selected tuning rate.

60. A system comprising:

a frequency-tunable light source;

an interferometer which during operation directs different portions of an optical wave front derived from the light source to multiple surfaces and recombines the different portions to form an optical interference image;

a multi-element photo-detector positioned to measure an interference signal at different locations of the optical interference image in response to varying the frequency of the light source; and an electronic controller coupled to the light source and the photo-detector, wherein during operation the controller:

i) varies the frequency of the light source over a range of tuning rates;

ii) records an interference signal for at least one of the locations in response the varying the frequency over the range of tuning rates;

iii) monitors a reference phase from a reference cavity produced in response to an additional portion of the optical wave front; and iv) transforms the interference signal for the at least one location into an optical path length (OPL) domain based on the monitored reference phase to produce a spectrum having a peak at an OPL corresponding to a pair of the multiple surfaces.

61. The system of claim 60, wherein the range of tuning rates includes a tuning rate sufficiently large to resolve an opticl path length corresponding to the pair of surfaces and a tuning rate smiller than a maximum tuning rate corresponding to a Nyquist sampling rate for the pair of the multiple surfaces.

62. The system of claim 60, wherein the spectrum S corresponds to $S(D)=|OPLT(D)|^2$, where D is a variable for optical path difference and OPLT(D) is an OPD transform, which can be expressed as:

$$OPLT(D) = \sum_{j=0}^{N-1} I_j W_j \exp\left(-i\varphi_{Mj}\frac{D}{D_M}\right)\Delta\varphi_{Mj},$$

where there are N increments to the varying of the optical wave frequency, j is an index for the N increments, $I_j$ is the interference signal at increment j, $W_j$ is a value for a weighting function at increment j, $D_M$ corresponds to an optical path length of the reference cavity, $\phi_{Mj}$ is the monitored reference phase at increment j, and $\Delta\phi_{Mj}$ is an increment in the monitored reference phase corresponding to increment j.

63. The system of claim 60, wherein during operation the electronic controller further selects a frequency tuning rate based on the OPL of the peak; and records an interference signal at a plurality of locations of the optical interference image in response to varying the frequency at the selected tuning rate.

64. The system of claim 63, wherein the selected tuning rate is a constant tuning rate.

65. The system of claim 63, wherein during operation the electronic controller further extracts a phase for each of the multiple locations based on the interference signal for the selected tuning rate.

* * * * *